United States Patent
Sato et al.

(10) Patent No.: US 6,619,071 B2
(45) Date of Patent: Sep. 16, 2003

(54) ADSORPTION-TYPE REFRIGERATING APPARATUS

(75) Inventors: Hideaki Sato, Anjo (JP); Katsuya Ishii, Nagoya (JP); Atsushi Kosaka, Okazaki (JP); Shigeo Numazawa, Kariya (JP); Seiji Inoue, Anjo (JP); Kouji Inagaki, Toyota (JP); Kazuhisa Yano, Aichi-gun (JP); Norihiko Setoyama, Aichi-gun (JP); Yoshiaki Fukuyama, Aichi-gun (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/163,732

(22) Filed: Jun. 6, 2002

(65) Prior Publication Data

US 2003/0005721 A1 Jan. 9, 2003

(30) Foreign Application Priority Data

Dec. 6, 2001 (JP) ........................ 2001-372915
Jun. 22, 2001 (JP) ........................ 2001-190313

(51) Int. Cl.[7] .................... F25B 15/00; F25B 27/00; F25B 17/08
(52) U.S. Cl. ............... 62/480; 62/238.3; 62/112
(58) Field of Search ................. 62/480, 238.3, 62/112, 457.9, 481, 106, 476

(56) References Cited

FOREIGN PATENT DOCUMENTS

JP  11-37598  2/1999

*Primary Examiner*—Chen Wen Jiang
(74) *Attorney, Agent, or Firm*—Harness, Dickey & Pierce, PLC

(57) ABSTRACT

In an adsorption-type refrigerating apparatus, an adsorber includes therein an adsorbent having a temperature-dependent characteristic in which an amount adsorbed in an adsorption step is larger than an amount adsorbed in a desorption step, even when a vapor pressure rate in the adsorption step is equal to or lower than a vapor pressure rate in the desorption step. Therefore, even when the cooling temperature of outside air for cooling the adsorbent increases, a sufficient cooling capacity can be obtained. In addition, a difference between the amount adsorbed in the adsorption step and the amount adsorbed in the desorption step can be made larger.

9 Claims, 3 Drawing Sheets

ADSORPTION-TYPE REFRIGERATING APPARATUS

CROSS REFERENCE TO RELATED APPLICATION

This application is based on Japanese Patent Applications No. 2001-190313 filed on Jun. 22, 2001, and No. 2001-372915 filed on Dec. 6, 2001, the disclosure of which is incorporated herein by reference.

BACKGROUND OF THE INVENTION

1. Field of the Invention

The present invention relates to an adsorption-type refrigerating apparatus which can be suitably used for an air conditioner.

2. Description of the Related Art

As described in Japanese Patent Laid-Open Publication No. Hei. 11-37598, an adsorption-type refrigerating apparatus has a cooling capacity by evaporating a refrigerant such as water, and prevents an increase in an inner pressure (i.e., evaporating pressure) of an evaporator by adsorbing the evaporated refrigerant into an adsorbent to perform continuous evaporation in an adsorption step. The capability of adsorbing the refrigerant gradually decreases (i.e., gradually saturates) as the adsorption of the refrigerant proceeds. Generally, when the capability of adsorbing the refrigerant becomes saturated, the adsorbent is heated to remove the refrigerant from the adsorbent, thereby recycling the refrigerant in a desorption step. Subsequently, the adsorption step is performed by the use of the removed refrigerant.

For such steps, the adsorption-type refrigerating apparatus generally has at least two adsorbers. That is, there are first and second adsorbers provided with containers or the like in which adsorbents are contained, respectively. When the first adsorber is in the adsorption step, the second adsorber is in the desorption step. Alternatively, when the second adsorber is in the adsorption step, the first adsorber is in the desorption step. Therefore, the refrigerating apparatus is capable of continuously performing its cooling capacity (cooling capacity).

The cooling capacity of the adsorption-type a refrigerating apparatus is determined based on the amount of the refrigerant to be evaporated. More specifically, as shown in FIG. 4, the cooling capacity is determined based on a difference $\Delta C$ between amount adsorbed $C1$ at the condition of the adsorption step, and amount adsorbed $C2$ at the condition of the desorption step. FIG. 4 shows an isotherm of a silicagel. In FIG. 4, the abscissa denotes the vapor pressure rate $\psi$ (i.e., a relative humidity) which is the rate of the partial pressure of water vapor around the adsorbent to the vapor pressure of saturated water (refrigerant) at the temperature of the adsorbent. The amount adsorbed $C$ is the mass of water adsorbed in the unit mass of the adsorbent.

The adsorbent generates heat when adsorbing the refrigerant (hereinafter, the heat is referred to as "adsorption heat"). The vapor pressure of saturated water at the temperature of the adsorbent increases as the temperature of the adsorbent increases, so the vapor pressure rate $\psi$ decreases to cause the reduction in the amount adsorbed $C$. In the adsorption step, therefore, the adsorption of the refrigerant is performed while the adsorbent is cooled. The adsorbent is generally cooled by the outside air. Thus, when the outside air temperature Tam increases, the vapor pressure rate $\psi1$ in the adsorption step becomes smaller, and the amount adsorbed $C1$ in the adsorption step becomes smaller.

On the other hand, in the desorption step, the adsorbent after completing the adsorption step is heated. When the outside air temperature Tam increases, the temperature difference between the outside air and a heat source for the heating becomes smaller. Therefore, the vapor pressure rate $\psi2$ in the desorption step increases, and the amount adsorbed $C2$ in the desorption step increases. Accordingly, the increase in the outside air temperature Tam leads to the decrease in the amount adsorbed $C1$ in the adsorption step and also leads to the decrease in the amount adsorbed $C2$ in the desorption step. Consequently, the amount of the refrigerant which can be evaporated decreases, so that the cooling capacity of the adsorption-type refrigerating apparatus can be decreased.

The inventor of the present invention calculates the difference between the amount adsorbed $C1$ of refrigerant in the adsorption step and the amount adsorbed $C2$ of refrigerant in the desorption step, with the assumption that the temperature of the heat source for the heating is 90° C. and the vapor temperature is 10° C. As a result, using a typical silica gel as the adsorbent, there was no difference between them when the outside air temperature becomes about 45° C., or higher. In such a case, therefore, the adsorption-type refrigerating apparatus will be substantially stopped.

SUMMARY OF THE INVENTION

In view of the foregoing problems, it is an object of the present invention to provide an adsorption-type refrigerating apparatus capable of having cooling capacity even when the cooling temperature of an adsorbent increases.

According to the present invention, in an adsorption-type refrigerating apparatus, an adsorber has therein an adsorbent for adsorbing evaporated refrigerant in an adsorption step, and for releasing the refrigerant adsorbed in the adsorbent by heating in a desorption step. The adsorbent has a temperature-dependent characteristic in which an amount adsorbed in the adsorption step is larger than an amount adsorbed in the desorption step even when a vapor pressure rate in the adsorption step is equal to or smaller than a vapor pressure rate in the desorption step. Accordingly, even when the vapor pressure rate in the adsorption step is equal to the vapor pressure rate in the desorption step, the amount adsorbed in the adsorption step is different from the amount adsorbed in the desorption step. Therefore, even when the cooling temperature of outside air for cooling the adsorbent increases, a sufficient cooling capacity can be obtained. In addition, a difference between the amount adsorbed in the adsorption step and the amount adsorbed in the desorption step can be made larger. As a result, the cooling capacity of the adsorption-type refrigerating apparatus can be improved while the amount of the adsorbent filled in the adsorber can be made smaller, even when the cooling temperature of the adsorbent is high.

Preferably, a ratio of an adsorption heat generated in the adsorbent to an evaporation latent heat of the refrigerant is set in a range between 1.2 and 1.6. Therefore, the refrigerant adsorbed in the adsorbent can be readily released at a relative low temperature (e.g., 100° C.) without adding an additional device.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENT

A preferred embodiment of the present invention will be described with reference to the accompanying drawings. In this embodiment, the present invention is typically applied to an adsorption-type refrigerating apparatus for a vehicle air conditioner.

Figure 1:
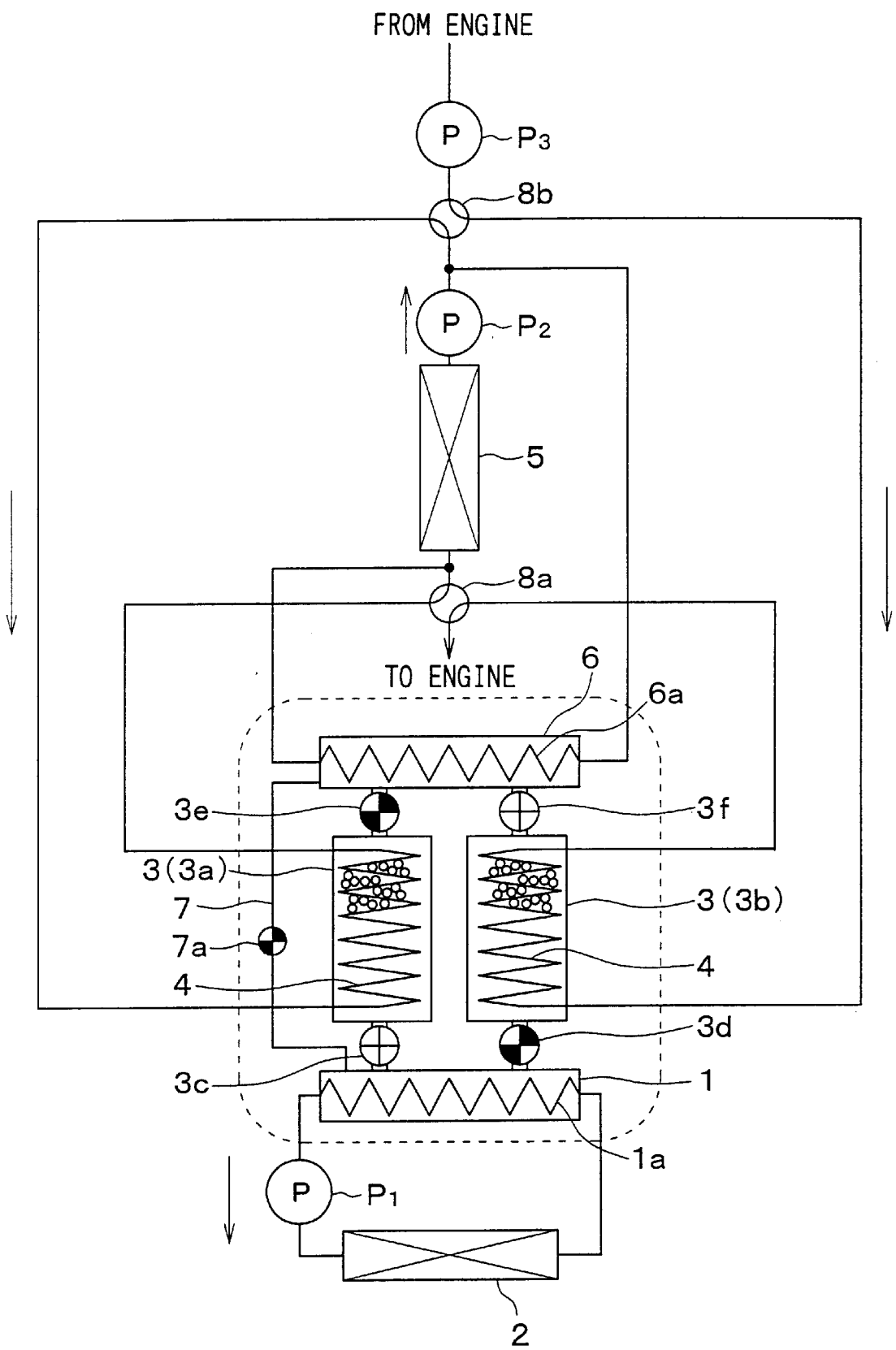
FIG. 1 is a schematic diagram of an adsorption-type refrigerating apparatus according to a preferred embodiment of the present invention.

As shown in FIG. 1, the adsorption-type refrigerating apparatus includes an evaporator 1, a pair of adsorbers 3 (3a, 3b), and a condenser 6, which are enclosed with a circle of broken line.

The evaporator 1 is a cooling unit generally maintained under vacuum and hermetically filled with refrigerant. The evaporator 1 includes an evaporation core 1a which is disposed to perform a heat exchange between a refrigerant and a thermal medium. The thermal medium exchanges heat with air to be blown into a passenger compartment, in an interior heat exchanger 2. In this embodiment, the refrigerant is water, and the thermal medium is a fluid prepared by mixing water with an ethylene-glycol antifreezing solution.

An adsorption core 4 (heat exchanger) is disposed within each of the adsorbers 3, and an adsorbent S is bonded to the entire surface of the adsorption core 4. An exterior heat exchanger 5 is a radiator for cooling a thermal medium by performing heat exchange between the thermal medium and the outside air. The condenser 6 is a heat exchanger having therein a condensation core 6a. In the condensation core 6a of the condenser 6, the refrigerant (water vapor) evaporated from the adsorber 3 (adsorbent S) is cooled and condensed by the thermal medium cooled by the exterior heat exchanger 5.

In this embodiment, the adsorbent S is one having a temperature-dependent characteristics in which the amount adsorbed C1 with respect to the vapor pressure rate ψ1 in an adsorption step (i.e., the step of adsorbing the refrigerant into the adsorbent) is larger than the amount adsorbed C2 with respect to the vapor pressure rate ψ2 in the desorption step (i.e., the step of removing the refrigerant from the adsorbent). As mentioned above, in this embodiment, two adsorbers 3 are provided in the adsorption-type refrigerating apparatus. Hereinafter, one of the adsorbers 3 is referred to as a first adsorber 3a (on the left side of FIG. 1) and the other one is referred to as a second adsorber 3b (on the right side of FIG. 1).

Furthermore, a return pipe 7 is provided for returning the water condensed in the condenser 6 to the evaporator 1, and a solenoid valve 7a is disposed in the return pipe 7 for opening and closing the return pipe 7. The evaporator 1 and the adsorbers 3 are communicated with each other through refrigerant pipes, respectively. In addition, the condenser 6 and the adsorbers 3 are also communicated with each other through refrigerant pipes, respectively. As shown in FIG. 1, solenoid valves 3c–3f for opening and closing the refrigerant pipes are provided in the refrigerant pipes. Each operation of the solenoid valves 3c to 3f and 7a, pumps P1 to P3 for circulating the thermal medium, electromagnetic four-way valves 8a, 8b for controlling the flow of the thermal medium is controlled by an electronic control unit (not shown).

Next, the operation of the air conditioner having the adsorption-type refrigerating apparatus of the present embodiment will be described below.

A pump P1 is operated to allow a circulation of the thermal medium between the interior heat exchanger 2 and the evaporator 1. Thus, the liquid refrigerant (e.g., water) in the evaporator 1 can be evaporated, so that the thermal medium is cooled, and air to be blown into the passenger compartment is cooled in the interior heat exchanger 2. Simultaneously, the solenoid valves 3c–3f and the four-way valves 8a, 8b are operated to be turned on and off at established time periods such that one of the above two adsorbers 3 is used for the adsorption step while the other one is used for the desorption step. For example, when the first adsorber 3a is used for the adsorption step while the second adsorber 3b is used for the desorption step, the solenoid valve 3c is opened and the solenoid valve 3e is closed, so that the thermal medium cooled by the exterior heat exchanger 5 is circulated in the first adsorber 3a. In this case, the solenoid valve 3d is also closed. Simultaneously, the thermal medium heated by the heat source (in the embodiment, the drive engine) is circulated in the second adsorber 3b while the solenoid valve 3f is opened.

Consequently, the evaporated refrigerant from the evaporator 1 is introduced into the first adsorber 3a and is then adsorbed in the adsorbent S in the first adsorber 3a. At this time, the temperature of the adsorbent S is maintained at a temperature almost corresponding to the outside air temperature by the thermal medium cooled in the exterior heat exchanger 5. On the other hand, because the thermal medium heated by the heat source is supplied to the second adsorber 3b, the refrigerant adsorbed in the adsorption step can be released from the adsorbent S in the second adsorber 3b. Then, the removed refrigerant (water vapor) is cooled in the condenser 6, so that the refrigerant can be condensed.

Next, the operation effects of the present embodiment will be described.

Figure 2:
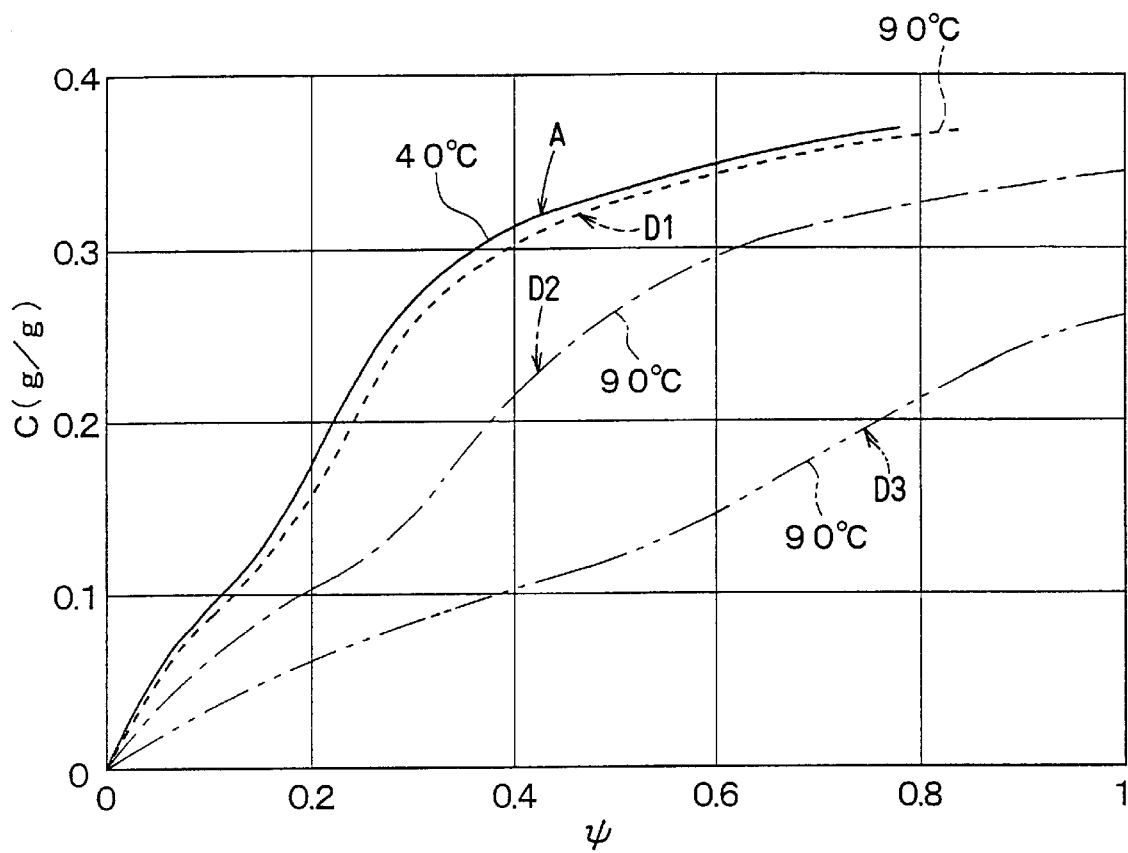
FIG. 2 is a graph showing an adsorption isotherm of an adsorbent to be used for the adsorption-type refrigerating apparatus according to the preferred embodiment of the present invention.

In the air conditioner of the present embodiment, as shown in FIG. 2, the adsorbent S being used is one having temperature-dependent characteristics in which the amount adsorbed C1 with respect to the vapor pressure rate ψ1 in the adsorption step is larger than the amount adsorbed C2 with respect to the vapor pressure rate ψ2 in the desorption step. Thus, even if the vapor pressure rate ψ1 in the adsorption step is equal to the vapor pressure rate ψ2 in the desorption step, the amount adsorbed C1 in the adsorption step is different from the amount adsorbed C2 in the desorption step. Accordingly, a sufficient cooling capacity can be surely obtained even when the cooling temperature of the adsorbent S increases.

Thus, it is possible to increase the difference ΔC between the amount adsorbed C1 in the adsorption step and the amount adsorbed C2 in the desorption step, as compared with an adsorbent which has no temperature dependency. Consequently, the adsorber 3 can be miniaturized (i.e., the filling amount of the adsorbent S can be decreased) while increasing the cooling capacity of the air conditioner having the adsorption-type refrigerating apparatus.

In order to provide the adsorbent S with the temperature dependency, the adsorption heat to be generated when the adsorbent S adsorbs the refrigerant is increased, as indicated by the Clausius-Clapeyron equation. That is, it can be represented by the equation (1):

$$dLn(P)/dT = \Delta Hvap/RT^2 \quad (1)$$

wherein "P" is a saturation pressure; "T" is a temperature; "ΔHvap" is an adsorption heat; and "R" is a gas constant.

However, if the adsorption heat "ΔHvap" becomes larger, the force for adsorbing the refrigerant (i.e., the adsorbing force) increases and then the temperature for removing the refrigerant from the adsorbent increases. In this case, there is the need of a heating device capable of applying a high temperature to the adsorbent S in the desorption step. Thus, manufacturing costs of the air conditioner having adsorption-type refrigerating apparatus may be increased.

In FIG. 2, A indicates an isotherm in the adsorption step at a temperature of 40° C., D1 indicates an isotherm in the desorption step at a temperature of 90° C. when a ratio of the adsorption heat to the evaporation latent heat is 1, D2 indicates an isotherm in the desorption step at a temperature of 90° C. when a ratio of the adsorption heat to the evaporation latent heat is 1.2, and D3 indicates an isotherm in the desorption step at a temperature of 90° C. when a ratio of the adsorption heat to the evaporation latent heat is 1.5.

From the studies and investigations conducted by the inventors of the present invention, it is confirmed that the refrigerant can be removed from the adsorbent at a low temperature equal to or lower than 100° C. when the adsorption heat is 1.2 times or more and less than 1.6 times of the evaporation latent heat of the refrigerant. Therefore, a sufficient cooling capacity can be obtained using the waste heat from the engine without additionally providing a special heating device, when the ratio of the adsorption heat to the evaporation latent heat of refrigerant is in a range between 1.2 and 1.6.

In the air conditioner of this embodiment, the adsorbent S is cooled using the outside air. Therefore, the cooling capacity, that is sufficient in practical use, can be obtained even when the outside air temperature increases to about 40° C. when the adsorbent has the amount adsorbed of at least 0.15 (g/g) at a vapor pressure rate ψ of 0.2 in the adsorption step. Therefore, the adsorbent, having the adsorption heat which is about 1.2 times of the evaporation latent heat of the refrigerant and having the amount adsorbed of about 0.15 (g/g) at a vapor pressure rate ψ of 0.2 in the adsorption step, is used in the present embodiment.

In addition, when the adsorption-type refrigerating apparatus is used for the vehicle air conditioner, the cooling temperature of the adsorbent S increases up to about 40° C. to 50° C., due to heat radiation from the road and heat radiation from the engine. According to the present invention, even when the cooling temperature of the adsorbent increases to 40° C. to 50° C. in the adsorption step, when the adsorbent S satisfies the above temperature-dependent characteristic, the cooling capacity can be sufficiently obtained.

In addition, when the adsorbent is used so that the vapor pressure rate in the adsorption step is in a range between 0.07–0.18, a sufficient cooling capacity can be obtained even when the cooling temperature of the adsorbent is in the range between 40° C. and 50° C. Further, the adsorbent is used such that the amount adsorbed at the vapor pressure rate of 0.18 in the adsorption step is equal to or larger than 80% of the amount adsorbed at the vapor pressure rate of 0.4 in the adsorption step. Accordingly, when the adsorption-type refrigerating apparatus is used for an air conditioner for a vehicle, a necessary cooling capacity can be sufficiently obtained.

Components of the adsorption-type refrigerating apparatus to be mounted in an engine compartment includes the adsorbers 3, the evaporator 1, the condenser 6, the solenoid valves 3c to 3f, and the like. An assembly integrating these components may be preferably to have a volume less than 15 litters as a result of investigating the engine compartments of various kinds of vehicles. In addition, the assembled size of the evaporator 1, the condenser 6, the solenoid valves 3c to 3f can be formed in a volume of about 4.5 litters or less. Therefore, it is necessary to set the size of the adsorber 3 at 10.5 litters or less.

The filling rate of the adsorbent S in the adsorber 3 is about 30%, and the bulk density of the adsorbent S is about 0.6 kg/litter. Therefore, the weight W of the adsorbent to be used for filling the adsorber 3 can be calculated as: 10.5× 0.3×0.6=1.89 kg. Because a steady cooling capacity to be required for the vehicle air conditioner is generally about 3 kW, the cooling capacity Q can be calculated by the equation (2):

$$Q = (W \times \Delta C \times \eta c \times \Delta H/\tau) \times \eta h \quad (2)$$

wherein "W" is the weight of the adsorbent to be used for filling one of two adsorbers 3, "ΔC" is the amplitude of the amount adsorbed of the refrigerant under the conditions at the adsorption step and at the desorption step, "ηc" is the amplitude efficiency of adsorption, which indicates the proportions of actual adsorption amplitudes within the switching time period with respect to the amplitude ΔC of the amount adsorbed of the refrigerant, "ΔH" is an evaporation latent heat of water, "τ" is a switching time period of the adsorption step and the desorption step, and "ηh" is the efficiency in consideration of the loss due to the variations in the temperatures of the adsorbent and the heat exchanger in the range between the temperature of hot water and the temperature of cold water.

In the equation (2), as described above, "Q" is 3 kW and "W" is 1.89 kg/2=0.95 kg. In addition, from the past investigations, it is appropriate that "τ" is about 60 seconds, and "ΔH", "ηc", and "ηh" are 2500 kJ/kg, 0.6, and 0.85, respectively, which are previously obtained. Therefore, "ΔC" can be calculated using these values based on the equation (2). That is, $$\Delta C = Q/W/\eta c/\Delta H \times \tau/\eta h$$
$$= 3.0/0.95/0.6/2500 \times 60/0.85$$
$$= 0.149 \text{ kg/kg}$$

Therefore, the adsorbent S to be used in the adsorption-type refrigerating apparatus of the vehicle air conditioner requires the characteristics of: ΔC≧0.15 g/g. Thus, in this embodiment, the adsorbent is used such that a difference between the amount adsorbed of refrigerant in the adsorption step and the amount adsorbed of refrigerant in the desorption step is equal to or larger than 0.15 (g/g).

Next, the method for manufacturing an adsorbent having the temperature dependent characteristic is described.

EXAMPLE 1

In a grow box with a nitrogen ventilation, 72 g of tetramethoxysilane and 7.1 g of titanium tetraisopropoxide are mixed while stirring at a room temperature. Then, the alkoxide solution is added in a mixture of 200 ml of methanol, 18 g of ion-exchanged water, and 0.125 ml of 2N HCl, and further stirred for 30 minutes at a room temperature, followed by the addition of 38.54 g of dodecyltrimethylammonium bromide. Then, under such conditions, the mixture is further stirred for 30 minutes.

Subsequently, 5 ml of 2N HCl is added in the mixture, followed by further stirring the mixture for 1 hour. Thereafter, the mixture solution is poured into a tray and is then placed in a draft overnight to remove methanol. Then, the mixture is subjected to a drier for two days to dry the mixture at a temperature of 45° C. The dried mixture is sintered at a temperature of 550° C. for 6 hours in the atmosphere to remove alkylammonium salt from the mixture.

Consequently, an adsorbent is obtained. When the adsorption isotherm of the obtained adsorbent at a temperature of 40° C. is measured, the amount adsorbed C of refrigerant is about 0.15 g/g at a vapor-pressure rate $\psi$ of 0.2, and the adsorption heat is about 1.4 times of the evaporation latent heat of water.

The adsorption isotherm is measured using Bell Soap (manufactured by Nippon Bell Co., Ltd.). In addition, the adsorption heat (J/g), generated while adsorbing the unit mass of water vapor, can be calculated by filling a heat exchanger with the adsorbent, measuring a heat-generating value at the time of adsorbing water vapor under predetermined conditions (e.g., temperature and vapor pressure ratio), obtaining the adsorption heat Q1 (J/g) per unit mass of the adsorbent by dividing the heat-generating value by the filling amount of the adsorbent, and dividing the adsorption heat Q1 (J/g) by $\Delta C$ (g/g) under the predetermined conditions obtained from the adsorption isotherm. The measurement in each of the following examples is also performed just as in the case with the measurement of the first example.

EXAMPLE 2

In a grow box with a nitrogen ventilation, 72 g of tetramethoxysilane and 7.1 g of titanium tetraisopropoxide are mixed while stirring at room temperature. The alkoxide solution is added in a mixture of 200 ml of methanol, 18 g of ion-exchanged water, and 0.125 ml of 2N HCl, and further stirred for 30 minutes at a room temperature, followed by the addition of 35.04 g of decyltrimethylammonium bromide.

Then, under such conditions, the mixture is further stirred for 30 minutes. Subsequently, 5 ml of 2N HCl is added in the mixture, followed by further stirring the mixture for 1 hour. Thereafter, the mixture solution is poured into a tray and is then placed in a draft overnight to remove methanol. Then, the mixture is subjected to a drier for two days to dry the mixture at a temperature of 45° C. The dried mixture is sintered at a temperature of 550° C. for six hours in the atmosphere to remove alkylammonium salt from the mixture.

Consequently, an adsorbent is obtained. When the adsorption isotherm of the obtained adsorbent at a temperature of 40° C. is measured, the amount adsorbed C of refrigerant is about 0.20 g/g at a vapor-pressure rate $\psi$ of 0.2, and the adsorption heat is about 1.4 times of the evaporation latent heat of water.

EXAMPLE 3

In a grow box with a nitrogen ventilation, 72 g of tetramethoxysilane and 7.1 g of titanium tetraisopropoxide are mixed while stirring at room temperature. The alkoxide solution is added in a mixture of 200 ml of methanol, 18 g of ion-exchanged water, and 0.125 ml of 2N HCl, and further stirred for 30 minutes at a room temperature, followed by the addition of 31.5 g of octyltrimethylammonium bromide. Then, under such conditions, the mixture is further stirred for 30 minutes. Subsequently, 5 ml of 2N HCl is added in the mixture, followed by further stirring the mixture for 1 hour. Thereafter, the mixture solution is poured into a tray and is then placed in a draft overnight to remove methanol. Then, the mixture is subjected to a drier for two days to dry the mixture at a temperature of 45° C. The dried mixture is sintered at a temperature of 550° C. for six hours in the atmosphere to remove alkylammonium salt from the mixture. Consequently, an adsorbent is obtained.

When the adsorption isotherm of the resulting adsorbent at a temperature of 40° C. is measured, the amount adsorbed C of refrigerant is about 0.17 g/g at a vapor-pressure rate $\psi$ of 0.2, and the adsorption heat is about 1.4 times of the evaporation latent heat of water.

EXAMPLE 4

After 1.54 g of decyltrimethylammonium bromide, 2.28 g of 1N sodium hydroxide, 71.7 g of water, and 25 g of methanol are mixed together, 0.046 g of sodium aluminate (purity 78%) dissolved in 1 g of water is added. Thereafter, 1.25 g of tetramethoxysilane (TMOS) (mole ratio of Si/Al is 95/5) is added to the mixture. The obtained porous-body/surfactant complex is stirred for 8 hours at a room temperature and is then left overnight. Subsequently, a suction filtration and a dispersion in water are repeated two times. Then, the suction filtration is performed again, and the filtrate is dried for 3 days at 45° C. The ontained powder is heated at a temperature of 550° C. for 6 hours to remove the surfactant from pores of the powder.

Consequently, an adsorbent is obtained. When the adsorption isotherm of the obtained adsorbent at a temperature of 40° C. is measured, the amount adsorbed C of refrigerant is about 0.20 g/g at a vapor-pressure rate $\psi$ of 0.2, and the adsorption heat is about 1.35 times of the evaporation latent heat of water.

EXAMPLE 5

After 1.54 g of decyltrimethylammonium bromide, 2.28 g of 1N sodium hydroxide, 72.7 g of water, and 25 g of methanol are mixed together, 1.32 g of tetramethoxysilane (TMOS) is added. The obtained porous-body/surfactant complex is stirred for 8 hours at a room temperature and is then left overnight. Subsequently, a suction filtration and a dispersion in water are repeated two times. Then, the suction filtration is performed again, and the filtrate is dried for 3 days at 45° C. The obtained powder is heated at a temperature of 550° C. for 6 hours to remove the surfactant from pores of the powder.

Consequently, an adsorbent is obtained. When the adsorption isotherm of the obtained adsorbent at a temperature of 40° C. is measured, the amount adsorbed C is about 0.16 g/g at the vapor-pressure rate $\psi$ of 0.2, and the adsorption heat is about 1.3 times of the evaporation latent heat of water.

EXAMPLE 6

After 1.54 g of decyltrimethylammonium bromide, 2.28 g of 1N sodium hydroxide, 70.7 g of water, and 25 g of methanol are mixed together, 0.046 g of sodium aluminate (purity 78%) dissolved in 2 g of water is added. Thereafter, 1.21 g of tetramethoxysilane (TMOS) (mole ratio of Si/Al is 92/8) is added to the mixture. The obtained porous-body/surfactant complex is stirred for 8 hours at a room temperature and is then left overnight. Subsequently, a suction filtration and a dispersion in water are repeated two times. Then, the suction filtration is performed again, followed by drying the filtrate for 3 days at 45° C. The obtained powder is heated at a temperature of 550° C. for 6 hours to remove the surfactant from pores of the powder.

Consequently, an adsorbent is obtained. When the adsorption isotherm of the obtained adsorbent at a temperature of 40° C. is measured, the amount adsorbed C is about 0.17 g/g at the vapor-pressure rate $\psi$ of 0.2, and the adsorption heat is about 1.3 times of the evaporation latent heat of water.

EXAMPLE 7

8 g of polyvinylpyrrolidone (a weight-average molecular weight of 40,000) is dissolved in 200 ml of methanol. Then, 19 g of tetramethoxysilane and 1.9 g of tetraisopropoxytitanium for increasing the surface-hydrophilicity in the pore are added in the solution. Furthermore, 5 ml of concentrated hydrochloric acid is added dropwise in the solution. Subsequently, a methanol solvent is removed from the solution by means of evaporation with an air ventilation or stirring for 24 hours at a room temperature. Then, the obtained gel compound is dried for 5 hours at a temperature of 80° C., followed by crushing into particles within a desired size range and classifying the particles. Then, the classified particles are sintered in an electric furnace for 4 hours at a temperature of 550° C.

Consequently, a porous body having pores with uniform diameter without containing an organic material is obtained. When the adsorption isotherm of the obtained adsorbent at a temperature of 40° C. is measured, the amount adsorbed C is about 0.17 g/g at the vapor-pressure rate $\psi$ of 0.2, and the adsorption heat is about 1.45 times of the evaporation latent heat of water.

EXAMPLE 8

Figure 3:
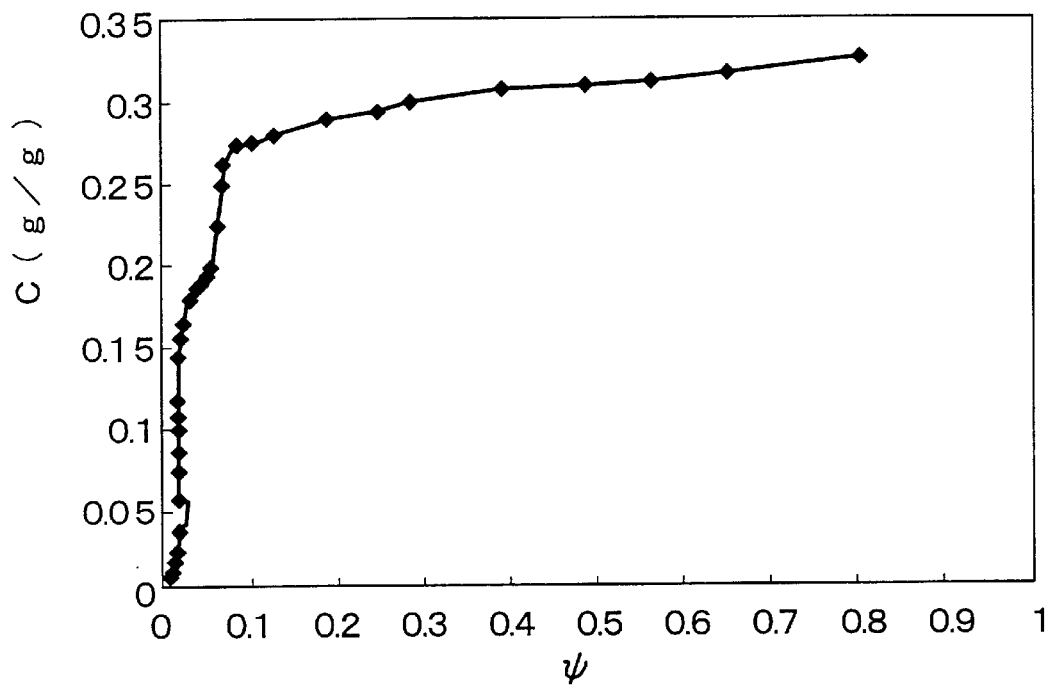
FIG. 3 is a graph showing an adsorption isotherm of an adsorbent to be used for the adsorption-type refrigerating apparatus according to the preferred embodiment of the present invention.
Figure 4:
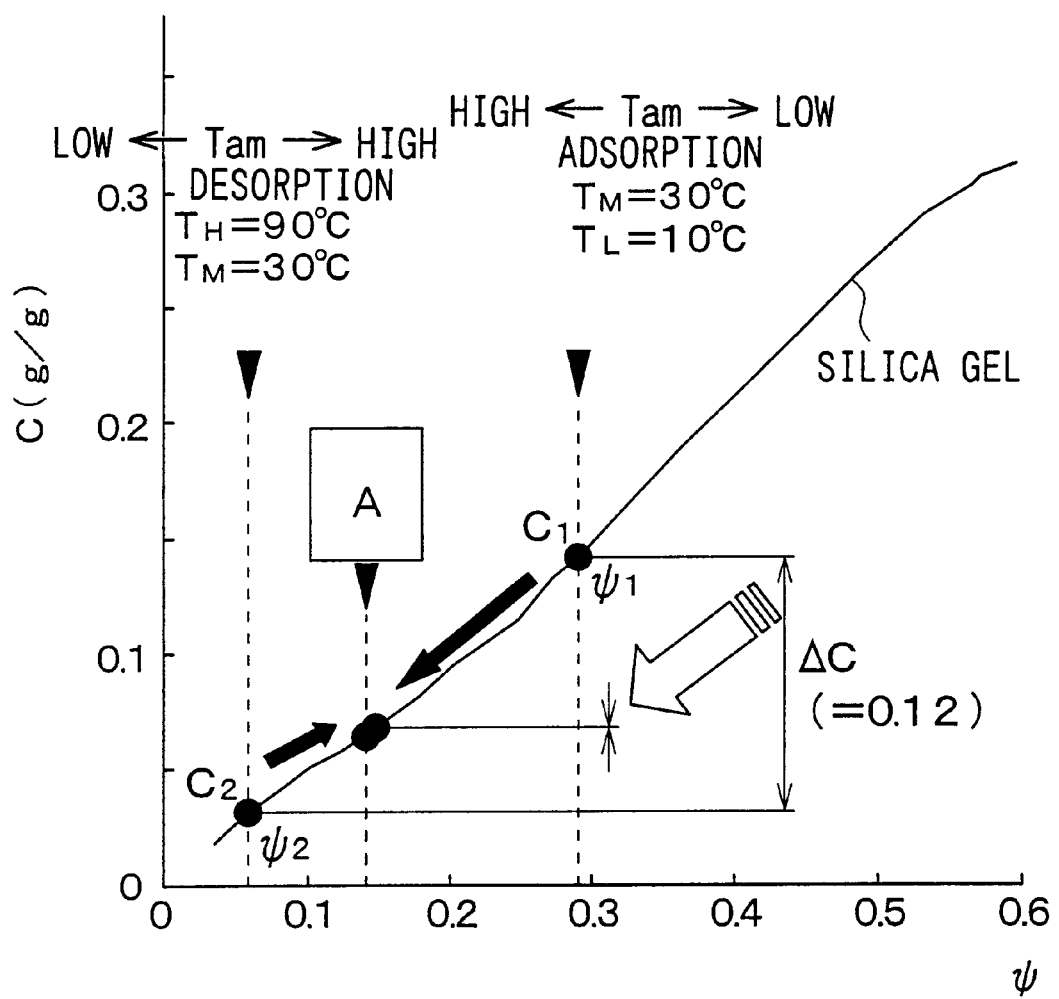
FIG. 4 is a graph showing an adsorption isotherm of an adsorbent in the related art.

Aluminum hydroxide, 85% phosphoric acid, 36% hydrochloric acid, and purified water are mixed together so that a gel mixture having a mole ratio of $Al_2O_3:P_2O_5: HCl:H_2O=$ 1.0:0.8:1.0:50 is obtained. The obtained gel mixture is moved to a stainless autoclave. A closed reaction system is heated and is then kept at a temperature of 140° C.–150° C. for 4 hours. The resulting suspension is filtrated to obtain a solid content. Then, it is dried overnight in the atmosphere. The resulting product is exposed in water vapor at a temperature of 100° C. for 24 hours, resulting in the desired aluminophosphate zeolite. Next, this powdery zeolite is molded to have a desired particle size. An adsorption isotherm of the zeolite using water as the refrigerant is represented in the graph shown in FIG. 3. In FIG. 3, the adsorption isotherm is measured at a temperature of 25° C.

When the adsorption-type refrigerating apparatus is used for the vehicle air conditioner, the outside air temperature for cooling the adsorbent S in the adsorption step will become in the range of 40° C. to 45° C. in the summer period. In this case, if the refrigerant temperature is 10° C., the vapor-pressure rate $\psi$ becomes in the range of 0.166–0.128. When the adsorber 3 is operated under such conditions, the ability of the adsorbent S is effectively brought out by exerting most of the maximum amount adsorbed of the adsorbent S under the above adsorption conditions.

As shown in FIG. 3, the adsorbing amount of the adsorbent S is saturated substantially at a maximum at a vapor-pressure rate $\psi$ of about 0.4. That is, the great part of the saturated adsorbing amount of the adsorbent (i.e., 80% or more) can be adsorbed at the vapor-pressure rate $\psi$ of about 0.4, so that a sufficient cooling capacity can be obtained even though the outside air temperature is in a range of 40° C. and 45° C.

Although the present invention has been fully described in connection with the preferred embodiment thereof with reference to the accompanying drawings, it is to be noted various changes and modifications will become apparent to those skilled in the art.

For example, in the above embodiment, the adsorption-type refrigerating apparatus of the present invention is typically used for the vehicle air conditioner. According to the present invention, however, it is not limited to such a configuration. The present invention may be also applied on other refrigerating apparatuses.

In the above embodiment, the solenoid valves 3c–3f are used. Instead of such valves 3c–3f, differential pressure regulating valves which can be automatically closed and opened by pressure differences may be used.

Such changes and modifications are to be understood as being within the scope of the present invention as defined by the appended claims.

What is claimed is:

1. An adsorption-type refrigerating apparatus comprising:
   a refrigerating unit for obtaining a cooling capacity by evaporating refrigerant; and
   an adsorber containing an adsorbent for adsorbing the evaporated refrigerant in an adsorption step, and for releasing the refrigerant adsorbed in the adsorbent by heating in a desorption step, wherein,
   the adsorbent has a temperature-dependent characteristic in which an amount adsorbed in the adsorption step is larger than an amount adsorbed in the desorption step even when a vapor pressure rate in the adsorption step is equal to or smaller than a vapor pressure rate in the desorption step.

2. The adsorption-type refrigerating apparatus according to claim 1, wherein,
   the adsorbent generates an adsorption heat when adsorbing refrigerant; and
   a ratio of the adsorption heat to an evaporation latent heat of the refrigerant is set in a range between 1.2 and 1.6, so that the adsorbent has the temperature-dependent characteristic.

3. The adsorption-type refrigerating apparatus according to claim 1, wherein,
   in the adsorption step, the amount adsorbed of the adsorbent is equal to or larger than 0.15 (g/g) when the vapor pressure rate is 0.2.

4. The adsorption-type refrigerating apparatus according to claim 1, wherein,
   when the adsorbent has the temperature-dependent characteristic, the adsorbent is used such that the refrigerating unit has the cooling capacity, even when a cooling temperature for cooling the adsorbent in the adsorption step is in a range between 40–50° C.

5. The adsorption-type refrigerating apparatus according to claim 1, wherein,
   the vapor pressure rate in the adsorption step is in a range between 0.07–0.18.

6. The adsorption-type refrigerating apparatus according to claim 1, wherein,
   the adsorbent is used such that a difference between the amount adsorbed in the adsorption step and the amount adsorbed in the desorption step is equal to or larger than 0.15 (g/g).

7. The adsorption-type refrigerating apparatus according to claim 1, wherein,
   the adsorbent is used such that the amount adsorbed at the vapor pressure rate of 0.18 in the adsorption step is equal to or larger than 80% of the amount adsorbed at the vapor pressure rate of 0.4 in the adsorption step.

8. The adsorption-type refrigerating apparatus according to claim 1, wherein, the adsorbent has a first adsorbent part and a second adsorbent part which alternately performs the adsorption step and the desorption step.

9. An adsorption-type refrigerating apparatus for an air conditioner for a vehicle, comprising:

a refrigerating unit for cooling air to be blown into a passenger compartment of the vehicle by evaporating refrigerant; and an adsorber containing an adsorbent for adsorbing evaporated refrigerant in an adsorption step, and for releasing the refrigerant adsorbed in the adsorbent by heating in a desorption step, wherein, the adsorbent has a temperature-dependent characteristic in which an amount adsorbed in the adsorption step is larger than an amount adsorbed in the desorption step even when a vapor pressure rate in the adsorption step is equal to or smaller than a vapor pressure rate in the desorption step;

the adsorbent generates an adsorption heat when adsorbing refrigerant; and the adsorbent has the temperature-dependent characteristic, by setting a ratio of the adsorption heat to an evaporation latent heat of the refrigerant in a range between 1.2 and 1.6.

* * * * *